US007562254B2

(12) United States Patent
Davis et al.

(10) Patent No.: US 7,562,254 B2
(45) Date of Patent: Jul. 14, 2009

(54) CHECKPOINTING AND RESTARTING LONG RUNNING WEB SERVICES

(75) Inventors: Douglas B. Davis, Raleigh, NC (US); Yih-Shin Tan, Raleigh, NC (US); Brad B. Topol, Raleigh, NC (US); Vivekanand Vellanki, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1380 days.

(21) Appl. No.: 10/612,613

(22) Filed: Jul. 1, 2003

(65) Prior Publication Data

US 2005/0015643 A1 Jan. 20, 2005

(51) Int. Cl.
G06F 11/00 (2006.01)
(52) U.S. Cl. ............................................. 714/16; 714/4
(58) Field of Classification Search ................... 714/15, 714/16
See application file for complete search history.

(56) References Cited

U.S. PATENT DOCUMENTS

| | | | | |
|---|---|---|---|---|
| 5,805,785 | A * | 9/1998 | Dias et al. ..................... 714/4 |
| 6,161,219 | A * | 12/2000 | Ramkumar et al. ......... 717/130 |
| 2002/0169889 | A1* | 11/2002 | Yang et al. ................... 709/244 |
| 2003/0233602 | A1* | 12/2003 | Lindquist et al. .............. 714/47 |
| 2004/0103195 | A1* | 5/2004 | Chalasani et al. .............. 714/4 |
| 2004/0103338 | A1* | 5/2004 | Chalasani et al. .............. 714/4 |
| 2004/0103339 | A1* | 5/2004 | Chalasani et al. .............. 714/4 |
| 2004/0123232 | A1* | 6/2004 | Hodges et al. ............... 715/513 |
| 2004/0167959 | A1* | 8/2004 | Doyle et al. .................. 709/203 |
| 2004/0243915 | A1* | 12/2004 | Doyle et al. .................. 714/796 |

OTHER PUBLICATIONS

N. Neves, et al., *A Checkpoint Protocol for an Entry Consistent Shared Memory System*, In Thirteenth ACM Symposium on Principles of Distributed Computing (PODC), pp. 1-9, (Aug. 1994).
C. Marsan, *IBM unveils Reliable HTTP*, NetworkWorldFusion, pp. 1-2, <http://www.nwfusion.com/news/2001/0726ibmreliable.html>, (Apr. 2003).

(Continued)

*Primary Examiner*—Robert Beausoliel
*Assistant Examiner*—Elmira Mehrmanesh
(74) *Attorney, Agent, or Firm*—Jeanine Ray-Yarlettes, Esq.; Steven M. Greenberg, Esq.; Carey Rodriquez Greenberg & Paul LLP

(57) ABSTRACT

The present invention is a checkpoint processor configured for coupling to individual Web services through a Web services engine. The checkpoint processor can include checkpoint logic programmed to store checkpoint data for the individual Web service instance invocations. The checkpoint processor further can include restart logic programmed to restore the stored checkpoint data to a replacement for failed ones of the individual Web service instance invocations. Finally, the checkpoint processor can include cleanup logic programmed to removed the stored checkpoint data for concluded, non-failed ones of the individual Web service instance invocations. Notably, in a preferred aspect of the invention, logic can be included for identifying an asynchronous correlator for each one of the individual Web service instance invocations and for storing the asynchronous correlator in association with corresponding ones of the stored checkpoint data.

24 Claims, 5 Drawing Sheets

OTHER PUBLICATIONS

G. Stellner, *CoCheck: Checkpointing and Process Migration for MPI*, 10th International Parallel Processing Symposium (IPPS '96) (Apr. 15-19, 1996), Honolulu, HI.

O. Babaoglu, et al., *Consistent Global States of Distributed Systems: Fundamental Concepts and Mechanisms*, Technical Report UBLCS-93-1, pp. 1-40, (Jan. 1993) Laboratory for Computer Science, University of Bologna.

A. Banks, et al.; HTTPR Specification (Draft Proposal), IBM Version 1.1 Dec. 3, 2001, pp. 1-63, (2001).

* cited by examiner

CHECKPOINTING AND RESTARTING LONG RUNNING WEB SERVICES

BACKGROUND OF THE INVENTION

1. Statement of the Technical Field

The present invention relates to the field of distributed computing and Web services, and more particularly to the field of checkpointing in a distributed system.

2. Description of the Related Art

Web services represent the leading edge of distributed computing and are viewed as the foundation for developing a truly universal model for supporting the rapid development of component-based applications over the World Wide Web. Web services are known in the art to include a stack of emerging standards that describe a service-oriented, component-based application architecture. Specifically, Web services are loosely coupled, reusable software components that semantically encapsulate discrete functionality and are distributed and programmatically accessible over standard Internet protocols.

Conceptually, Web services represent a model in which discrete tasks within processes are distributed widely throughout a value net. Notably, many industry experts consider the service-oriented Web services initiative to be the next evolutionary phase of the Internet. Typically, Web services can be defined by an interface such as the Web services definition language (WSDL), and can be implemented according to the interface, though the implementation details matter little so long as the implementation conforms to the Web services interface. Once a Web service has been implemented according to a corresponding interface, the implementation can be registered with a Web services registry, such as Universal Description, Discovery and Integration (UDDI), as is well known in the art. Upon registration, the Web service can be accessed by a service requestor through the use of any supporting messaging protocol, including for example, the simple object access protocol (SOAP).

In a service-oriented application environment supporting Web services, locating reliable services and integrating those reliable services dynamically in realtime to meet the objectives of an application has proven problematic. While registries, directories and discovery protocols provide a base structure for implementing service detection and service-to-service interconnection logic, registries, directories, and discovery protocols alone are not suitable for distributed interoperability. Rather, a more structured, formalized mechanism can be necessary to facilitate the distribution of Web services in the formation of a unified application.

Notably, the physiology of a grid mechanism through the Open Grid Services Architecture (OGSA) can provide protocols both in discovery and also in binding of Web services, hereinafter referred to as "grid services", across distributed systems in a manner which would otherwise not be possible through the exclusive use of registries, directories and discovery protocols. As described both in Ian Foster, Carl Kesselman, and Steven Tuecke, *The Anatomy of the Grid*, Intl J. Supercomputer Applications (2001), and also in Ian Foster, Carl Kesselman, Jeffrey M. Nick and Steven Tuecke, *The Physiology of the Grid*, Globus.org (Jun. 22, 2002), a grid mechanism can provide distributed computing infrastructure through which grid services instances can be created, named and discovered by requesting clients.

Grid services extend mere Web services by providing enhanced resource sharing and scheduling support, support for long-lived state commonly required by sophisticated distributed applications, as well as support for inter-enterprise collaborations. Moreover, while Web services alone address discovery and invocation of persistent services, grid services support transient service instances which can be created and destroyed dynamically. Notable benefits of using grid services can include a reduced cost of ownership of information technology due to the more efficient utilization of computing resources, and an improvement in the ease of integrating various computing components. Thus, the grid mechanism, and in particular, a grid mechanism which conforms to the OGSA, can implement a service-oriented architecture through which a basis for distributed system integration can be provided—even across organizational domains.

Importantly, Grid services in many cases need not be short lived, transient Web services, but long running Web services. For instance, a long running Web service can result from computing for long intervals, or from ensuring access to a running service for an extended duration. Typically, however, Web services are implemented according to known servlet techniques which can be disposed in an application server. Yet, servlets traditionally have been used mostly to perform short lived operations over the course only of a minute or two minutes.

In this regard, when an application server intends upon destroying a servlet, for example when a Web application is to be restarted, the application server generally will assume that a servlet responding to a request only will require a minute or so to complete a pending request before the application can destroy the servlet. While the foregoing assumption may be appropriate for a typical servlet implementing a transient Web service, the same will not hold true a long running Web service. In particular, it is known that Web services can be suspended and resumed in an ad hoc fashion in the ordinary course of distributed computing-particularly in the context of a business-to-business (B2B) transaction. Furthermore, in the event of a crash of an application server hosting a long running Web service, recovery has proven problematic.

SUMMARY OF THE INVENTION

The present invention addresses the foregoing deficiencies of prior art application server implementations and provides a novel and non-obvious method, system and computer program product for ensuring the survival of Web services across application server crash and restart events. More particularly, through a novel and non-obvious application of checkpointing technology, long running Web services and their respective execution states can be revived in response to a restart event. In this way, notwithstanding the short-lived servlet-oriented configuration of an application server, long running Web services can be accommodated in an application server.

In accordance with the present invention, a checkpoint processor can be configured for coupling to individual Web services through a Web services engine. The checkpoint processor can include checkpoint logic programmed to store checkpoint data for the individual Web service instance invocations. The checkpoint processor further can include restart logic programmed to restore the stored checkpoint data to a replacement for failed ones of the individual Web service instance invocations. Finally, the checkpoint processor can include cleanup logic programmed to removed the stored checkpoint data for concluded, non-failed ones of the individual Web service instance invocations. Notably, in a preferred aspect of the invention, logic can be included for identifying an asynchronous correlator for each one of the individual Web service instance invocations and for storing the asynchronous correlator in association with corresponding ones of the stored checkpoint data.

A method for managing checkpoints in a Web application can include storing a state object for an invocation of a requesting Web service instance; and, responsive to a failure in the Web service instance, restarting a replacement Web service instance and providing the state object to a replacement Web service instance for the requesting Web service instance. Notably, the storing step can further include storing a unique identifier for the requesting Web service instance along with the stored state object. The storing step yet further can include identifying an asynchronous correlator for the invocation; and, storing the identified asynchronous correlator along with the stored state object. Finally, the storing step can include detecting a notable event in the Web service instance; and, responsive to the detection, storing a state object for an invocation of a requesting Web service instance. Alternatively, the storing step can include periodically storing a state object for an invocation of a requesting Web service instance.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a method and system for checkpointing and restarting long running Web services. In accordance with the present invention, individual Web service instances can checkpoint their respective states associated with particular invocations either periodically or in response to a triggering event. More particularly, the individual Web service instances can invoke checkpointing functionality included with or in association with an underlying Web services engine supporting each of the Web services instances. For each Web service instance invocation, a uniquely identifying instance identifier can be persisted in memory during the checkpointing process as can any state information forwarded by the Web service instance. Additionally a correlator able to identify an asynchronous communications session between the specific invocation and an invoking client further can be persisted in memory. Subsequently, when a restarting of a Web service instance invocation is required, for example in consequence of an application server crash, the restarted Web service instance invocation can be restored to its former state by uploading each of the instance identifier, the persisted state information and the asynchronous correlator.

Figure 1:
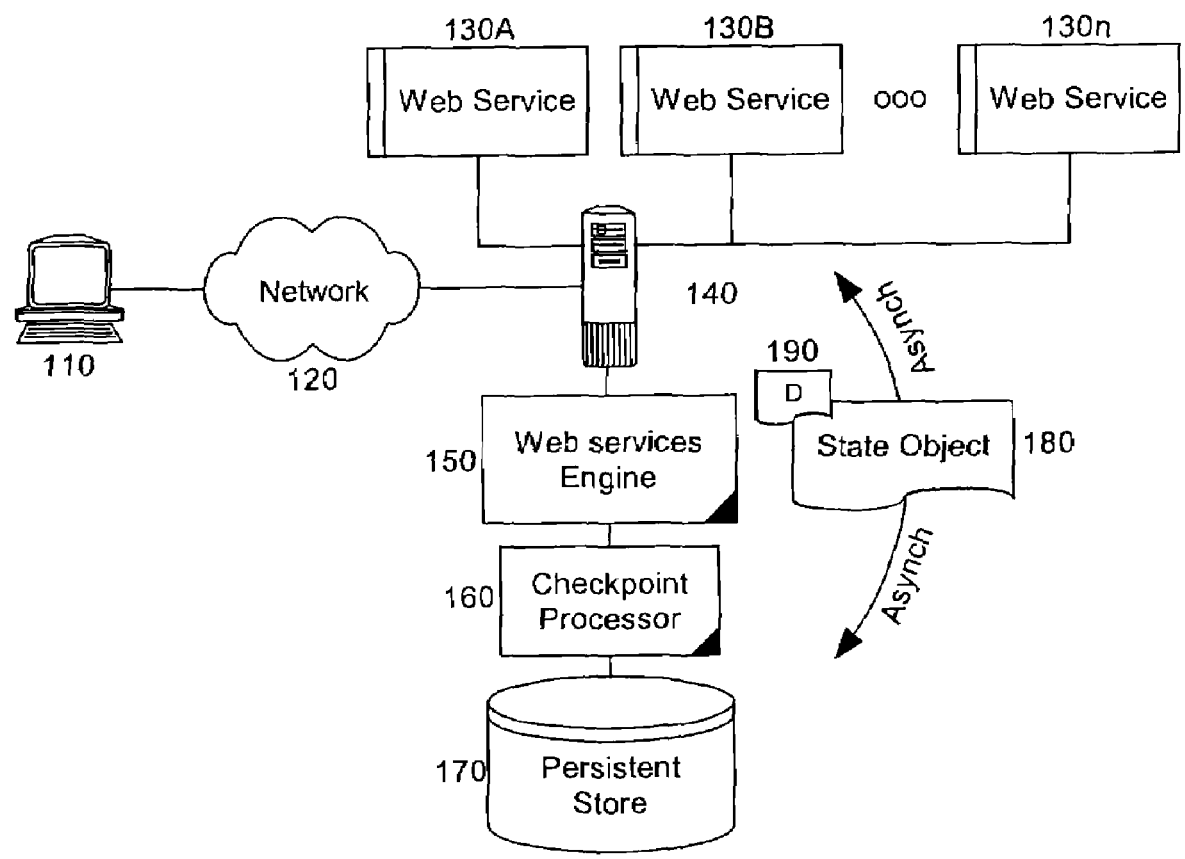
FIG. 1 is a schematic illustration of a Web services architecture which has been configured to checkpoint and restart Web services in accordance with the present invention.

FIG. 1 is a schematic illustration of a Web services architecture which has been configured to checkpoint and restart Web service instance invocations in accordance with the present invention. The Web services architecture can include a Web services engine 150 disposed in or associated with an application server 140. The Web services engine 150 can create instances of Web services 130A, 130B, 130n and the Web services engine can moderate external interactions with the instances of Web services 130A, 130B, 130n. Client computing elements 110 (only one client computing element shown for purposes of simplicity) can access the instances of Web services 130A, 130B, 130n through the invocation of service requests over the computer communications network 120, and the receipt of a result set to the invocation, also over the computer communications network 120. In this regard, the interaction between client computing elements 110 and the instances of Web services 130A, 130B, 130n will be recognized by the skilled artisan as typical of a conventional Web services architecture.

Significantly, however, unlike a conventional Web services architecture, a checkpoint processor 160 can be coupled to the Web services engine 150. The checkpoint processor 160 can provide both underlying functionality (methodology) for managing checkpoints on behalf of the instance invocations of Web services 130A, 130B, 130n, and an external interface to the functionality so that the functionality can be accessed at will by the instances of Web services 130A, 130B, 130n. To that end, the checkpoint processor 160 can receive and persist state objects 180 provided by the instances of Web services 130A, 130B, 130n in a persistent store 170. Additionally, the checkpoint processor 160 can store in association with individual ones of the persisted state objects 180, corresponding correlative identifiers 190 each which can identify the specific asynchronous communications session for each invocation.

Notably, when an individual one of the invocations of the instances of Web services 130A, 130B, 130n must be restarted, the state of the individual one of the instance invocations can be restored through the operation of the checkpoint processor 160. Specifically, the persisted state object 180 associated with the restarted invocation can be retrieved from the persistent store and uploaded to the restarted invocation. Moreover, the correlative identifier 190 for the asynchronous communications session can be returned to the restarted instance invocation so that the asynchronous session which had formerly been established between client computing element 110 and the instance invocation can be resumed seamlessly without revealing to the client computing element 110 that a service interruption had transpired.

Figure 2:
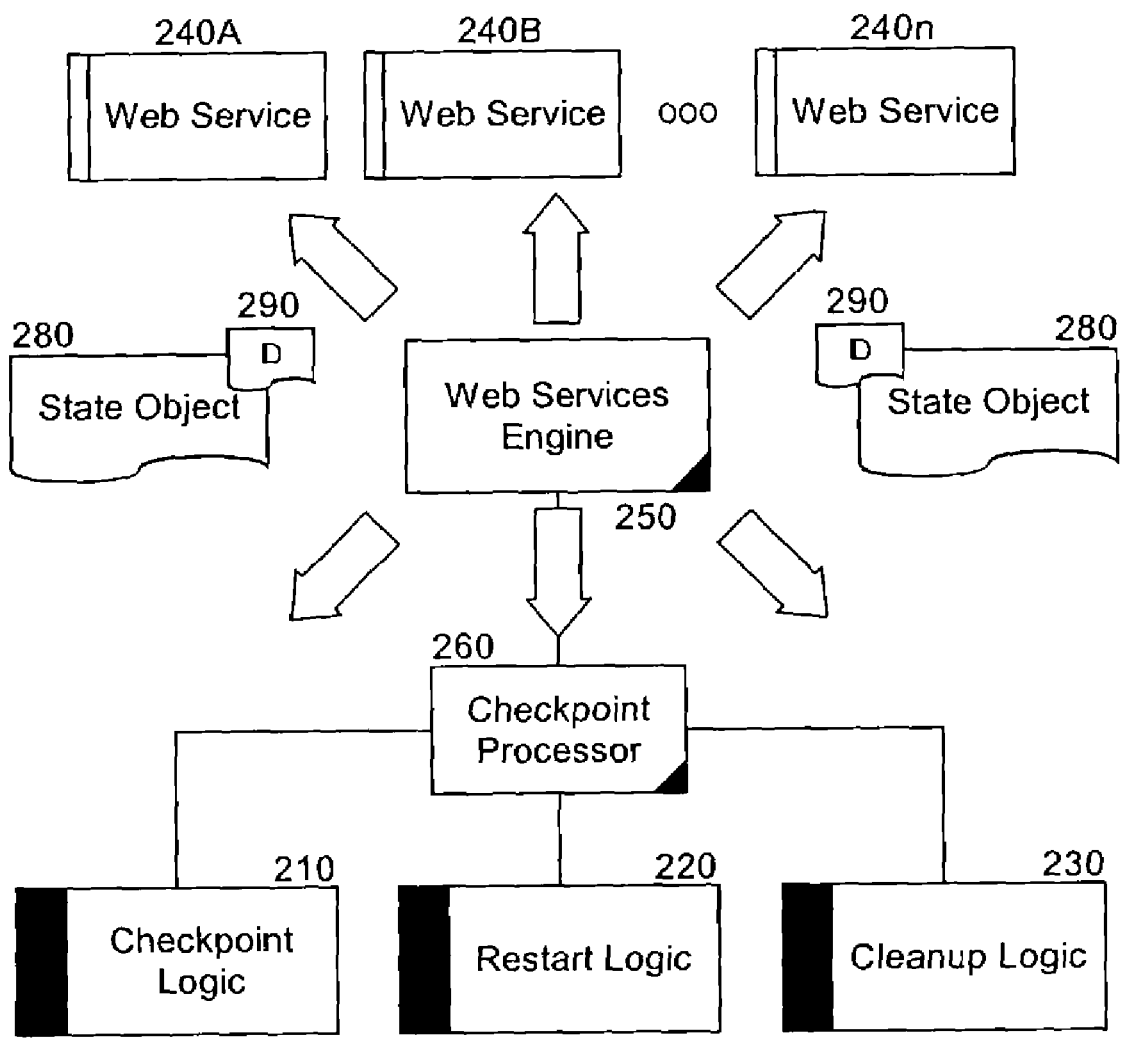
FIG. 2 is a block diagram illustrating a process for both managing a checkpointing process in an application server and for recovering a Web service instance using persisted data processed in the checkpointing process.

FIG. 2 is a block diagram illustrating a system for both managing a checkpointing process in an application server and for recovering a Web service instance invocation using persisted data processed in the checkpointing process of FIG. 1. The system can include a checkpoint processor 260 coupled to a Web services engine 250. The checkpoint processor 260 can include each of checkpoint logic 210, restart logic 220 and cleanup logic 230. The checkpoint logic 210 can be configured to invoke a checkpointing process at the request of individual Web service instances 240A, 240B, 240n communicatively linked to the Web services engine 250. Restart logic 220, by comparison, can be configured to restore the state of a failed invocation of the Web service instances 240A, 240B, 250n wherein the state had been previously persisted through the checkpoint logic 210. Finally, the cleanup logic 230 can remove persisted checkpoint data from the data store where it is no longer necessary to retain such checkpointed data.

In operation, individual ones of the Web services 240A, 240B, 240n can access the checkpoint processor 260 through a published interface (not shown). More specifically, through the course of operation, individual ones of the Web services 240A, 240B, 240n can request the creation and persistence of checkpoint data in the form of a state object 280 and correlative identifier through checkpoint logic 210. The request for checkpointing can arise spontaneously, periodically, or upon the occurrence of a notable event, such as upon detecting the impending failure of the node hosting the individual ones of the Web services 240A, 240B, 240n. As an example, upon detecting one or more exceptions in the node, a checkpoint can be requested for prophylactic purposes.

Figure 3A:
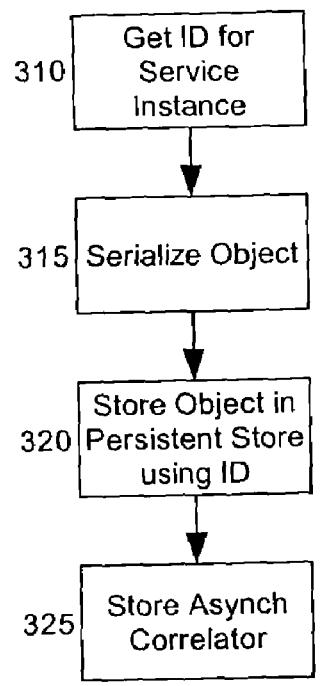
FIG. 3A is a flow chart illustrating a process for managing a checkpointing process in the system of FIG. 1.

FIG. 3A is a flow chart illustrating a process for managing a checkpointing process in the checkpoint logic 210 of FIG. 2. Beginning in block 310, a unique identifier can be retrieved for Web service instance requesting the checkpoint operation. In block 315, the state of the Web service can be disposed in a data object and serialized for storage. In block 320, the serialized object can be placed in persistent storage so that the serialized object can be retrieved using the unique identifier. Finally, an asynchronous correlator, for instance an HTTPR transport correlator, identifying the specific invocation and its invoking client can be persisted in the store, in addition to any other preferred context data. In this way, upon the failure of a Web service invocation, a replacement Web service invocation can be restored to the previously stored state seamlessly without the knowledge of an interacting client.

Returning now to FIG. 2, when it has been determined that a restart will be required for an invocation of the Web services 240A, 240B, 240n, the restart logic 220 can induce the creation of a replacement Web service invocation, associate with the creation of a replacement invocation, or identify an existing Web service able to resume processing previously undertaken by the failed Web service invocation. In furtherance of this purpose, the state object 280 can be retrieved and forwarded to the replacement instance invocation of the Web service. As part of the retrieval and forwarding process, the correlative identifier for the state represented within the state object 280 further can be provided to the replacement instance of the Web service. In this way, the transaction between the Web service instance and its client associated with the correlative identifier 290 can proceed seamlessly without the knowledge by the associated client of the failure.

Figure 3B:
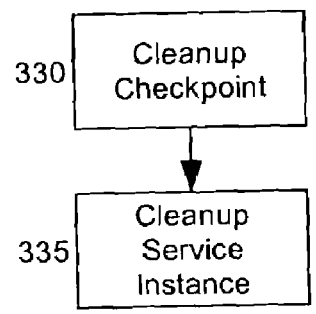
FIG. 3B is a flow chart illustrating a process for performing cleanup on a Web service instance invocation after the Web service has completed its operation; and, FIG. 3C is a flow chart illustrating a process for recovering a Web service instance using persisted data processed in the checkpointing process of FIG. 3A; and, FIG. 4 is a block illustration of a process for managing residency data for individual Web service instances.
Figure 3C:
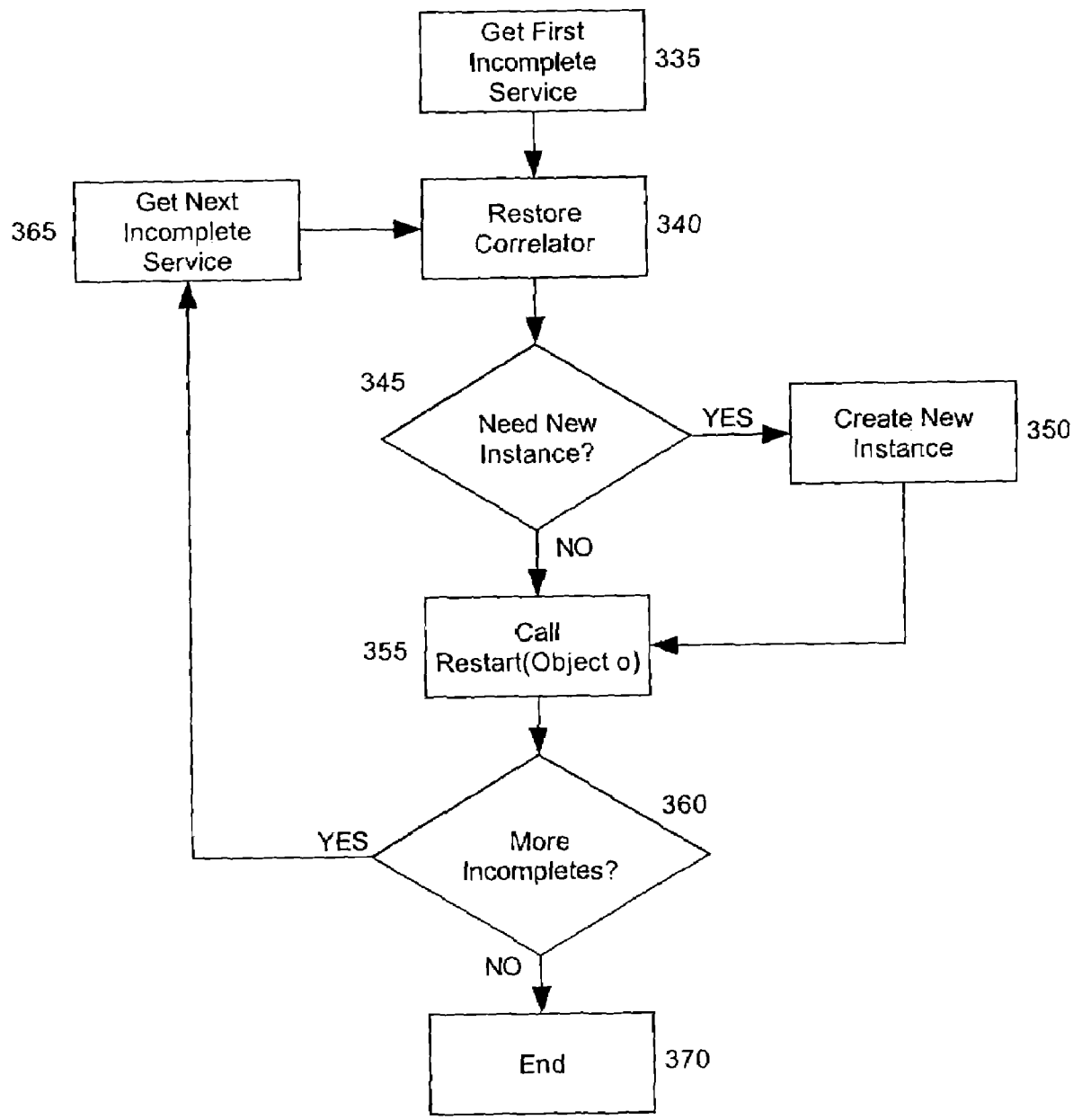

As a more particular illustration, FIG. 3C is a flow chart depicting a process for recovering a Web service instance using persisted data processed in the checkpointing process of FIG. 3A. Initially, the restart logic 220 of FIG. 2 can scan the persistent store for incomplete Web service instance invocation references. In this regard, beginning in block 335, a first Web service instance invocation requiring a restart can be identified. In block 340, a previously stored correlator, for instance an HTTPR correlator, in addition to other previously stored context data, and the serialized checkpoint data itself can be retrieved.

In block 345, if a new instance of the Web service is to be created, in block 350, a new Web service instance can be instantiated. Otherwise, where an existing Web service instance can accommodate the restoration of the incomplete Web service instance, a new instance need not be created. In both cases, in block 355, the checkpointed state, context data and correlator can be passed to the replacement Web service instance. Moreover, in decision block 360 and block 365, the foregoing process can repeat for every identified incomplete Web service instance affected by the failure of an application, server or node.

Information that has been subjected to the checkpoint process by the checkpoint logic 210 of FIG. 2, only must remain persisted until the associated Web service instance invocation has completed its operation and the result has been successfully transferred to the client. Subsequently, the cleanup logic 230 can discard the checkpointed information for the Web service instance invocation. More particularly, cleanup logic 230 can remove the persisted state objects 280 and correlative identifiers associated with the individual one of the Web services 240A, 240B, 240n. In particular, upon the successful completion of a Web service instance invocation, the cleanup logic 230 can purge the persistent store of state objects 280 persisted on behalf of the successfully completed Web service instance invocation.

In more specific illustration, FIG. 3B is a flow chart illustrating a process for performing cleanup on a Web service instance after the Web service has completed its operation. Beginning in block 330, a cleanup operation can be performed on the persistent store. Responsive to the invocation of the cleanup operation, state information associated with the successfully completed invocation can be discarded. Furthermore, in block 335, a cleanup operation within the hosting Web service further can discard any state information stored locally in the Web service instance.

In a preferred aspect of the present invention, handler chains further can be configured to checkpoint their respective states in coordination with the checkpointing operation of an associated Web service coupled to a pivot handler. As it is well-known in the art, handler chains can execute both before and after a Web service instance has been invoked, and typically perform preparatory or housekeeping functions, such as logging, encryption, decryption and access control. In some cases, handlers executing after the invocation of a Web service may require data from a handler executing in preparation for the invocation of the Web service. In consequence, in the present invention, whenever the Web service executes a checkpoint process, so too can the handlers checkpoint their respective states. To accommodate the checkpointing of handler state as well as the state of the Web service instance invocation, a data structure can be persisted which associates the correlator and object identifier with each handler and the Web service instance invocation.

Figure 4:
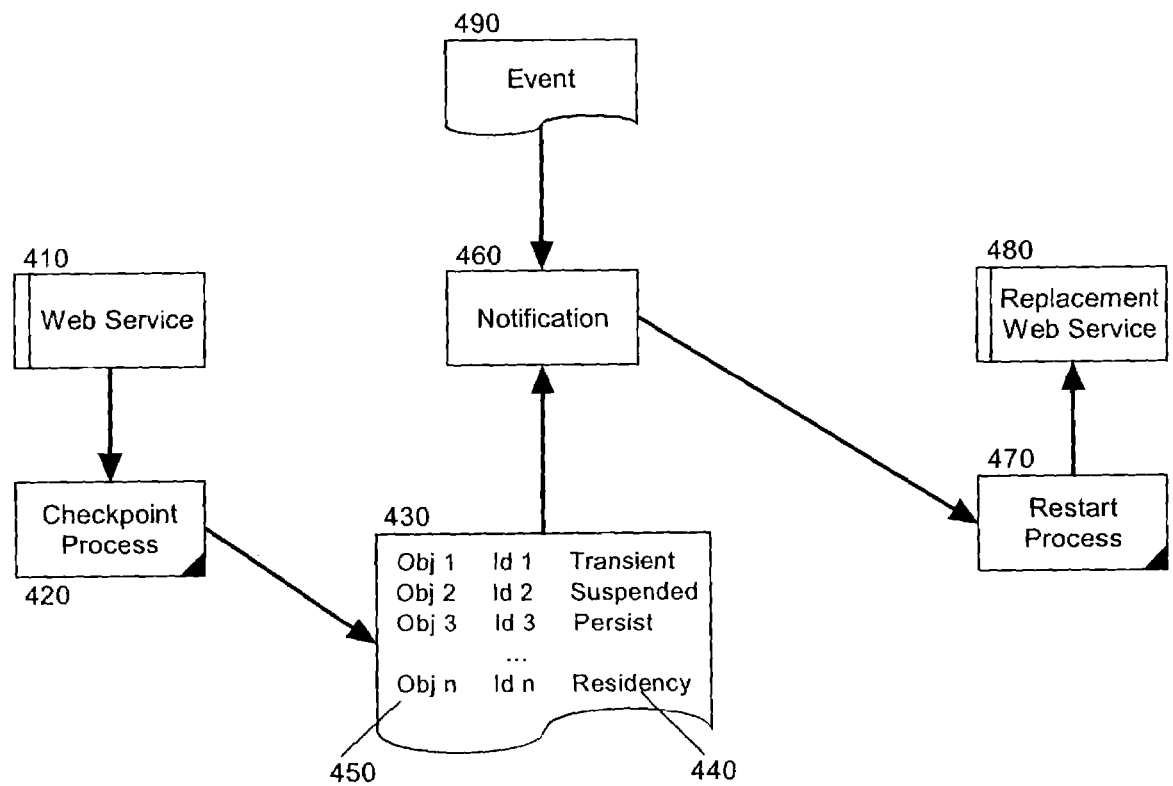

The information required by a Web service invocation to preserve the state of a Web service invocation can extend beyond the checkpointing event and a necessitated restart event. In particular, scheduled transactions can become suspended, and later resumed after some delay, as is the typical case in interactions between B2B partners, or in the case of node failover arising from failing nodes. Referring to FIG. 4, in this case, in the course of a checkpoint process 420 invoked by a Web service instance 410, checkpoint objects 450 can be stored in persistent storage 430 along with a specific residency indicator 440 which can indicate the status of the Web service invocation. The status can include "transient", "suspended", "persisted", etc.

Once the residency indicator 440 has been stored in association with a Web service invocation, the checkpoint process 420 can establish notification events 460 for use by the restart process 470. More particularly, observed individual events 490 can trigger varying types of restart processing within the restart process 470. For example, a Web service having a residency indicator of "suspended" can indicate to the Web services engine that a response handler ought not be invoked though the Web service may have exited normally. In this way, the sheer quantity of logic required to coordinate a typical B2B Web service interaction can be reduced simply by reference to the residency indicator of a given Web service instance invocation.

It is a notable advantage of the present invention that long running Web service instances can checkpoint partial results produced from an instance invocation so that the invocation itself can survive a failure of the parent Web application, application server, or underlying node. Additionally, the asynchronous communications correlator, such as the HTTPR correlator can be leveraged so that the resilience of a Web service instance invocation can survive even where a response is owed over a computer communications network. The use of handler chains further can be accommodated in accordance with the present invention through the checkpointing of handler state in addition to the Web service instance invocation state.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A checkpoint processor configured for coupling to individual Web services through a Web services engine, said checkpoint processor comprising:
   checkpoint logic programmed to store checkpoint data for the individual Web service instance invocations;
   restart logic programmed to restore said stored checkpoint data to a replacement for failed ones of the individual Web service instance invocations; and,
   cleanup logic programmed to removed said stored checkpoint data for concluded, non-failed ones of the individual Web service instance invocations.

2. The checkpoint processor of claim 1, further comprising logic for identifying an asynchronous correlator for each one of the individual Web service instance invocations and for storing said asynchronous correlator in association with corresponding ones of said stored checkpoint data.

3. A method for managing checkpoints in a Web application, the method comprising the steps of:
   storing a state object for an invocation of a requesting Web service instance; and,
   responsive to a failure in said Web service instance, restarting a replacement Web service instance and providing said state object to a replacement Web service instance for said requesting Web service instance.

4. The method of claim 3, wherein said storing step further comprises storing a unique identifier for said requesting Web service instance along with said stored state object.

5. The method of claim 4, wherein said storing step further comprises the steps of:
   identifying an asynchronous correlator for said invocation; and,
   storing said identified asynchronous correlator along with said stored state object.

6. The method of claim 5, wherein said step of providing further comprises the step of providing said asynchronous correlator to said replacement Web service instance.

7. The method of claim 4, wherein said step of providing further comprises the step of providing said unique identifier to said replacement Web service instance.

8. The method of claim 3, wherein said storing step comprises the steps of:
   detecting a notable event in said Web service instance; and,
   responsive to said detection, storing a state object for an invocation of a requesting Web service instance.

9. The method of claim 3, wherein said storing step comprises the step of periodically storing a state object for an invocation of a requesting Web service instance.

10. The method of claim 3, further comprising the step of discarding said stored state object when said Web service invocation has completed said invocation nominally.

11. The method of claim 3, further comprising the step of storing state data for a handler chain managing said Web service instance.

12. The method of claim 3, further comprising the steps of:
   storing a residency indicator for said Web service instance invocation; and,
   registering at least one selected event which when received causes an initiation of said restarting and providing steps.

13. The method of claim 3, wherein said step of restarting comprises the steps of:
   determining whether an existing Web service instance can act as said replacement Web service instance; and,
   if an existing Web service instance cannot be located which can act as said replacement Web service instance, instantiating a replacement Web service instance.

14. A machine readable storage having stored thereon a computer program for managing checkpoints in a Web application, the computer program comprising a routing set of instructions for causing the machine to perform the steps of:
   storing a state object for an invocation of a requesting Web service instance; and,
   responsive to a failure in said Web service instance, restarting a replacement Web service instance and providing said state object to a replacement Web service instance for said requesting Web service instance.

15. The machine readable storage of claim 14, wherein said storing step further comprises storing a unique identifier for said requesting Web service instance along with said stored state object.

16. The machine readable storage of claim 15, wherein said storing step further comprises the steps of:
   identifying an asynchronous correlator for said invocation; and,
   storing said identified asynchronous correlator along with said stored state object.

17. The machine readable storage of claim 16, wherein said step of providing further comprises the step of providing said asynchronous correlator to said replacement Web service instance.

18. The machine readable storage of claim 14, wherein said storing step comprises the step of periodically storing a state object for an invocation of a requesting Web service instance.

19. The machine readable storage of claim 14, wherein said storing step comprises the steps of:
detecting a notable event in said Web service instance; and,
responsive to said detection, storing a state object for an invocation of a requesting Web service instance.

20. The machine readable storage of claim 15, wherein said step of providing further comprises the step of providing said unique identifier to said replacement Web service instance.

21. The machine readable storage of claim 14, further comprising the step of discarding said stored state object when said Web service invocation has completed said invocation nominally.

22. The machine readable storage of claim 14, further comprising the step of storing state data for a handler chain managing said Web service instance.

23. The machine readable storage of claim 14, further comprising the steps of:
storing a residency indicator for said Web service instance invocation; and,
registering at least one selected event which when received causes an initiation of said restarting and providing steps.

24. The machine readable storage of claim 14, wherein said step of restarting comprises the steps of:
determining whether an existing Web service instance can act as said replacement Web service instance; and,
if an existing Web service instance cannot be located which can act as said replacement Web service instance, instantiating a replacement Web service instance.

* * * * *